United States Patent [19]

Baudouin et al.

[11] 4,042,349
[45] Aug. 16, 1977

[54] METHOD OF FRACTIONATION OF A GASEOUS MIXTURE BY ADSORPTION

[75] Inventors: Yvonne Baudouin, Palaiseau; Guy Simonet, Paris; Robert Eluard, Paris; Claude Pivard, Paris, all of France

[73] Assignee: L'Air Liquide, Societe Anonyme pour l'Etude et l'Exploitation des Procedes Georges Claude, Paris, France

[21] Appl. No.: 298,774

[22] Filed: Oct. 18, 1972

[51] Int. Cl.² ............................................ B01D 53/04
[52] U.S. Cl. ......................................... 55/25; 55/62; 55/75
[58] Field of Search ................. 55/25, 58, 62, 75, 179, 55/389

[56] References Cited

U.S. PATENT DOCUMENTS

| | | | |
|---|---|---|---|
| 3,085,379 | 4/1963 | Kiyonaga et al. | 55/62 |
| 3,086,339 | 4/1963 | Skatstrom et al. | 55/62 |
| 3,338,030 | 8/1967 | Feldbauer | 55/62 |
| 3,430,418 | 3/1969 | Wagner | 55/25 |
| 3,564,816 | 2/1971 | Batta | 55/62 |
| 3,636,679 | 1/1972 | Batta | 55/62 |

*Primary Examiner*—Wilbur L. Bascomb, Jr.
*Assistant Examiner*—Robert H. Spitzer
*Attorney, Agent, or Firm*—Young & Thompson

[57] ABSTRACT

An improved method of fractionation of a gaseous mixture by adsorption, in which the efficiency of extraction and the content of the desired constituent in the gaseous fraction extracted are increased, the method utilizing two or more adsorption lines, each including at least one adsorber comprising an adsorbent mass which preferentially adsorbs at least one constituent of the gaseous mixture, the first adsorption line comprising:

a constant-pressure extraction stage, during which the gaseous mixture is introduced into the inlet of said line, circulates from the inlet to the outlet of at least one adsorber in said line in the adsorption direction, at a high pressure in said adsorber, so as to obtain at the outlet of said line a gaseous fraction impoverished in at least one constituent of said gaseous mixture;

a regeneration stage comprising a period of falling pressure, during which the outlet of the adsorption line is closed and there is extracted at the inlet of said line a gaseous fraction enriched in at least one constituent of said gaseous mixture, while reducing the pressure in the adsorber to a low pressure for said adsorber;

and a pressure-increase stage, during which the pressure in said adsorber is increased to the high pressure for said adsorber.

The invention is applicable to any process of fractionation by adsorption and in particular to the purification of hydrogen from a steam re-forming unit.

16 Claims, 13 Drawing Figures

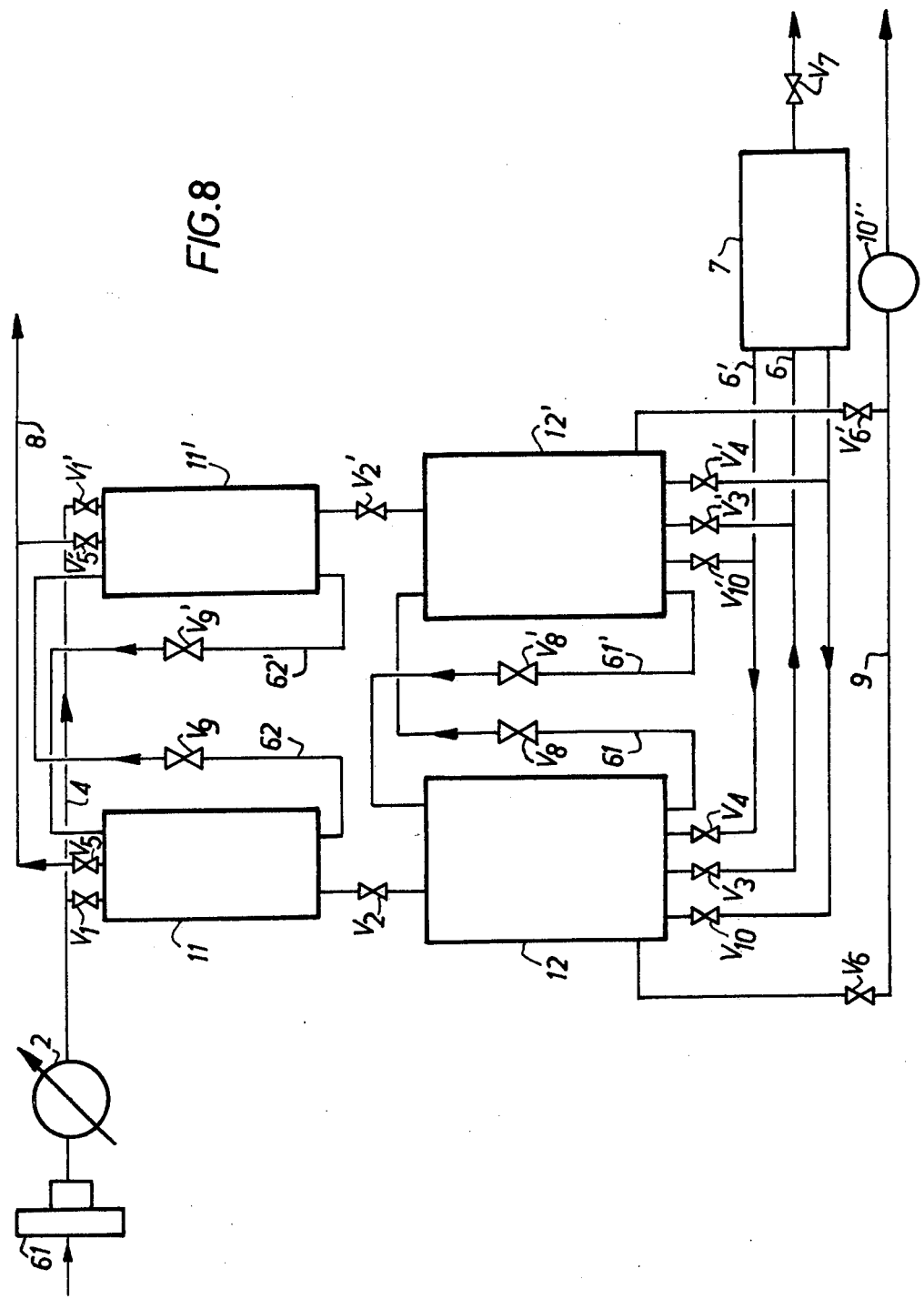

METHOD OF FRACTIONATION OF A GASEOUS MIXTURE BY ADSORPTION

The present invention relates to a method of fractionation of a gaseous mixture by adsorption.

Methods of fractionation by adsorption form the subject at the present time of numerous applications in extremely varied technical fields: purification of gases (for example, purification of air in water and carbon dioxide), fractionation of gaseous mixtures in order to obtain one of the constituents in the pure state (for example production of oxygen or enriched air by adsorption).

In this connection, the U.S. Pat. No. 3,155,468 describes for example a method of production of air enriched in oxygen by adsorption.

The present invention essentially relates to a method of fractionation of a gaseous mixture by adsorption, utilizing at least one first adsorption line and one second adsorption line, each including at least one adsorber comprising at least one adsorbent mass which preferentially adsorbs at least one constituent of the gaseous mixture, the said method comprising, for the first adsorption line:

A constant-pressure extraction stage during which the gaseous mixture is introduced into the inlet of the first adsorption line, circulates from the inlet to the outlet of at least one adsorber in the said line in the direction of adsorption, at a high pressure in the said adsorber, in order to obtain, at the outlet of the said adsorption line, a gaseous fraction impoverished in at least one constituent of the said gaseous mixture;

A regeneration stage comprising a period of falling pressure during which the outlet of the adsorption line is closed, and there is extracted at the inlet of the first adsorption line at least one gaseous fraction enriched in at least one constituent of the said gaseous mixture, by reducing at least the pressure existing in the said adsorber to a low pressure for the said adsorber;

A pressure-increase stage comprising a period of putting under pressure, during which at least the pressure existing in the said adsorber is increased to the high pressure for the said adsorber.

The present invention has for its object to improve the method of fractionation by adsorption defined above, in order to improve the efficiency of extraction of the desired constituent, evacuated from the adsorption installation with the gaseous fraction extracted during the constant-pressure extraction stage.

Another object of the invention is directed to increasing the content of the desired constituent in the gaseous fraction extracted during the constant-pressure extraction stage.

According to the invention, the regeneration stage of the first adsorption line also comprises a period of balancing, during which a gaseous fraction is extracted from the outlet of at last one adsorber, while reducing at least the pressure existing in the said adsorber, from a pressure at most equal to the high pressure to an intermediate pressure for the said adsorber, and the pressure-increase stage of the said first adsorption line comprises a balancing period carried out during at least part of the balancing period of the regeneration stage of the second adsorption line, during which there is introduced through the inlet of at least one said adsorber, in concurrent flow with the direction of adsorption, a gaseous fraction extracted from the outlet of at least one other adsorber of the second line of adsorption, while increasing at least the pressure existing in the said adsorber up to another intermediate pressure for this latter adsorber.

When each adsorption line comprises at least two adsorbers arranged in series, operating under different pressures during the constant-pressure extraction stage, according to the invention, a balancing stage is also carried out during which at least one first adsorber is put into communication with at least one second adsorber of the same adsorption line, and at the end of which the pressure existing in at least the first and second adsorbers is substantially equal to an intermediate pressure.

The present invention will now be described in more detail in the description which follows below, given by way of example only and not in any restrictive sense, reference being made to the accompanying drawings, in which:

FIG. 1 shows diagrammatically a first adsorption installation utilizing two adsorption lines, each comprising two adsorbers working at different pressures;

FIG. 2 shows the evolution of the pressure (in atmospheres absolute) respectively in the first adsorber of one adsorption line, in the direction of adsorption (curves in full lines) and in the first adsorber of the other adsorption line (curve in broken lines) as a function of time expressed in seconds, when an adsorption process in accordance with the invention is carried out in the installation shown in FIG. 1.

FIGS. 3 and 3' represent the evolution of the pressure in a first adsorber of the installation shown in FIG. 1, utilizing two alternative forms of the method of adsorption shown in FIG. 2;

FIG. 8 shows a sixth adsorption installation, in which each adsorption line comprises two adsorbers, with the possibility of balancing the corresponding adsorbers;

Figure 1:
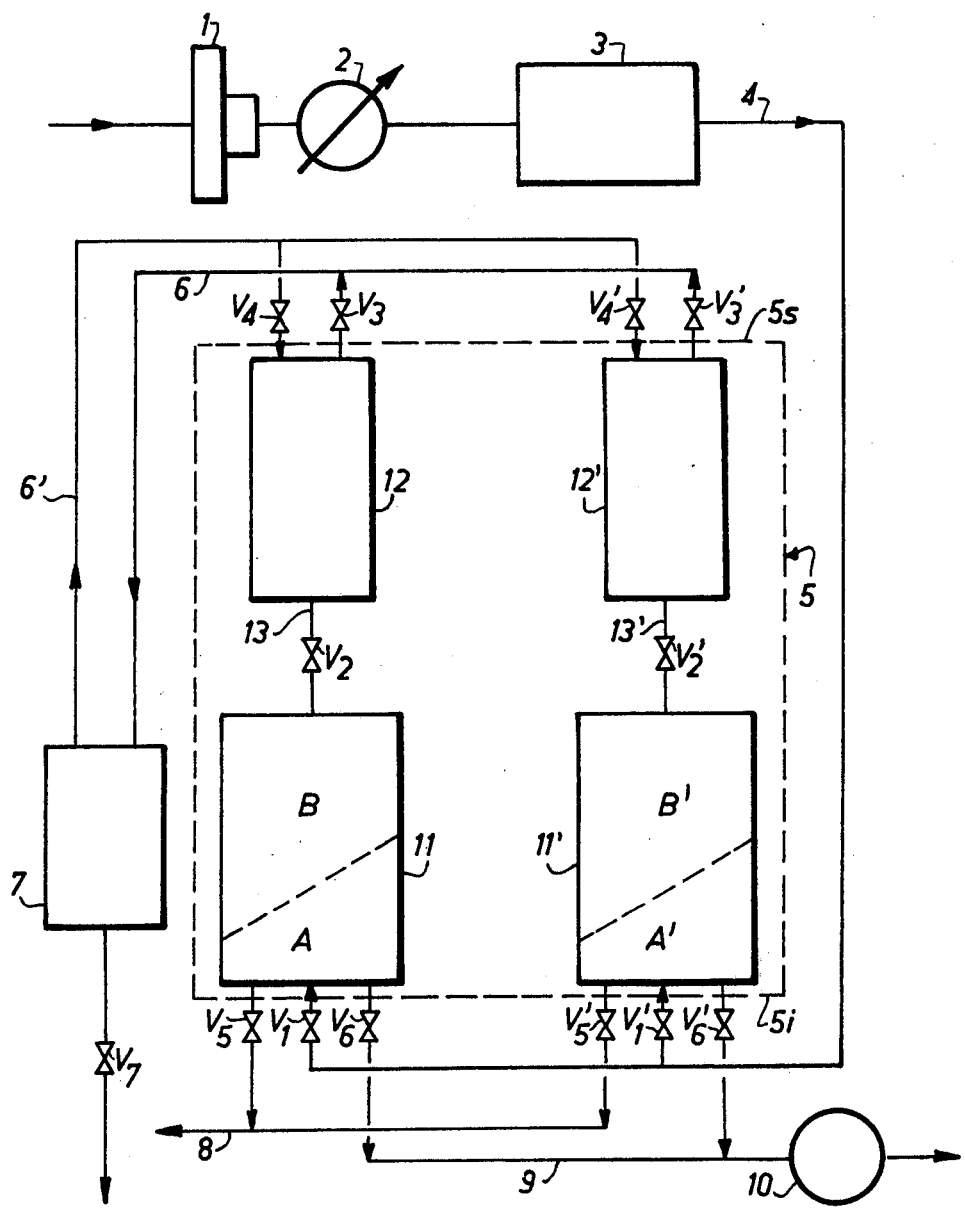

FIG. 1 shows an adsorption installation comprising a compressor 1, a refrigerant-condenser 2 and a buffer chamber 3 on a conduit 4 introducing gas into an adsorption zone which has been given the general reference 5. This adsorption zone comprises an introduction zone 5i and an outlet zone 5s.

A gas-outlet conduit 6 connects the outlet zone 5s of the adsorption zone to a buffer chamber 7, this chamber being further connected to the said outlet zone 5s by another conduit 6'.

The adsorption zone 5 can be connected to atmosphere by means of a conduit 8 coupled to the introduction zone 5i, this introduction zone being further connected by a conduit 9 to means 10 such as a vacuum pump in order to reduce the pressure in the adsorption zone to pressures lower than atmospheric pressure.

In the form of embodiment shown, the adsorption zone 5 is formed by two alternately operative adsorption lines each comprising two adsorbers 11 and 12 respectively on one line and 11' and 12' on the other line.

Sets of valves are provided on the various gas inlet conduits into the adsorption zone 5 (conduits 4 and 6') on the one hand and on the gas outlet conduits of the said adsorption zone (conduits 6, 8 and 9). In addition, a valve is provided on each of the conduits 13 and 13' connecting to each other the adsorbers 11 and 12 on the one hand and 11' and 12' on the other.

These sets of valves are respectively as follows: $V_1$ and $V_1'$ on the introduction conduit 4 for the gas to be treated;

$V_2$ and $V_2'$ on the conduits 13 and 13' connecting the adsorbers to each other;

$V_3$ and $V_3'$ on the purified gas outlet conduit 6;

$V_4$ and $V_4'$ on the conduit 6' introducing the purified gas into the adsorbers;

$V_5$ and $V_5'$ on the conduit 8 for connection to atmosphere;

$V_6$ and $V_6'$ on the conduit 9 connecting the adsorbers to the vacuum pump 10.

The installation of FIG. 1 may be employed for example for the production of enriched air. In such a case, the adsorbers 11 and 11' may contain a bed of alumina (A—A') and a bed of a molecular sieve having for example a volume equal to one-half that contained in the adsorbers 11 and 11'. The pressure existing in the buffer-chamber 3 is for example about 6 bars, while the pressure existing in the buffer-chamber 7 is about 2 bars.

Figure 2:
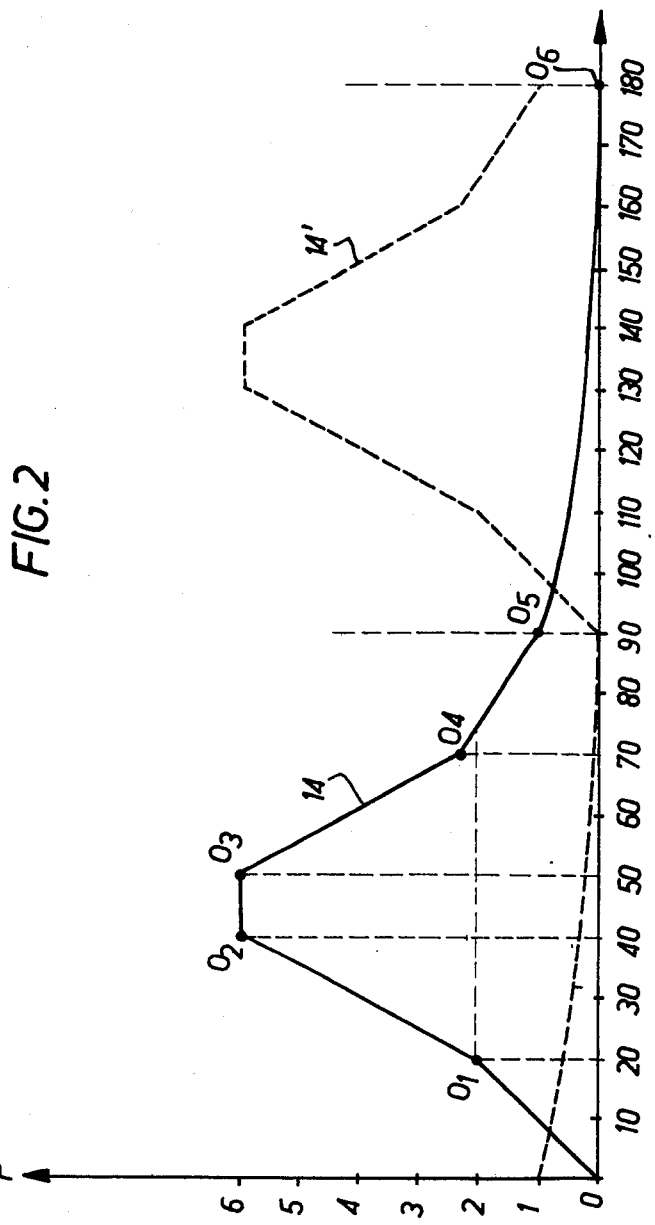

The entire operating cycle of one of the adsorbers, for example of the adsorbers 11 and 11', is shown by the curves 14 and 14' of the diagram given in FIG. 2. In this diagram, the abscissae correspond to the time (in seconds) and the ordinates correspond to the pressure in atmospheres absolute existing in the adsorbers 11 or 11'.

At the origin, at the time 0 corresponding to the end of the regeneration of the adsorber 11 for example, the valves $V_1$, $V_3$, $V_4$, $V_5$ and $V_6$ are closed and only the valve $V_2$ is open.

The valve $V_4$ is then opened, which causes an increase in pressure to about 2 bars of the whole of the two adsorbers 11 and 12. When this pressure of 2 bars is reached in the adsorber 11, the valves $V_4$ and $V_2$ are closed. This phase of increase in pressure is known as the front rise; it is represented by the sector $O-O_1$ in FIG. 2. The pressure rise thus produced, known as the front rise, consists of increasing the pressure in the adsorber by means of a part of the purified gas produced, collected during the course of a previous adsorption in the buffer chamber 7, and without outlet of gas from the adsorber, of thus carrying away the part of the constituent which may still be present in the adsorber, in the portion of the adsorber opposite to the inlet of the purified gas through the valve $V_4$.

By bringing back into the zone of the adsorber opposite the purified gas inlet through the valve $V_4$, the small quantities of the constituent having been adsorbed and which may still be present in the adsorber after completion of the regeneration, such a front rise makes it possible to prevent this constituent from passing into the buffer chamber 7 and therefore prevents the purified gas collected in this buffer chamber 7 from being soiled by impurities.

After the opening of the valve $V_1$, the gas to be treated (air in the present case) coming from the buffer chamber 3 is admitted into the adsorber 11 until the pressure in this adsorber has reached a value of about 6 bars.

This second phase of the pressure rise is known as inflation, and is represented by the sector $O_1-O_2$ in FIG. 2.

When this pressure of 6 bars is reached in the adsorber 11, the valve $V_3$ is opened and then the valve $V_2$, which is in a position known as "open-expansion."

During a period of time (corresponding for example to the sector $O_2-O_3$ of FIG. 2) air is admitted at a constant pressure of 6 bars into the adsorber 11 through the valve $V_1$, is expanded through $V_2$ and passes into the adsorber 12 at a pressure in the vicinity of that existing in the buffer-chamber 7, that is to say of the order of about 2 bars.

After the expiry of this period, the valve $V_1$ is closed and the air at 6 bars absolute present in the adsorber 11 continues to expand through the valve $V_2$ into the adsorber 12 and the chamber 7, until equilibrium of pressure is obtained, that is to say a pressure of the order of about 2.3 bars (which corresponds to the sector $O_3-O_4$ of FIG. 2). The valve $V_3$ is then closed and the valve $V_2$ is fully opened, together with the valve $V_5$, so as to ensure the connection to atmosphere of the gas remaining in the two adsorbers 11 and 12, in counter-flow with the direction of flow of the gases during the adsorption proper, through the conduit 8 (sector $O_4-O_5$ of FIG. 2).

When atmospheric pressure is reached at point $O_5$ of FIG. 2, the valve $V_5$ is closed, as is also the valve $V_6'$ (which controls the end of the period under vacuum of the battery of adsorbers 11', 12') and the valve $V_6$ is opened so as to permit the regeneration of the adsorbers 11 and 12 by putting them under vacuum by means of the vacuum pump 10, which corresponds to the sector $O_5-O_6$ of the curves shown in FIG. 2.

This regeneration under vacuum is continued up to the end of the connection to atmosphere of the other adsorption line ($O_6$, FIG. 2). By virtue of this method of operation, while one adsorption battery is working on production, the other is on regeneration, which enables continuous operation of the vacuum pump 10 to be obtained, as is clearly shown by the diagram of FIG. 2.

In the case where this installation is utilized for the treatment of air, the water and carbon dioxide contained in the air to be treated are fixed on the first adsorption bed A of the adsorbers 11 and 11', comprising activated alumina.

The desorption of the water and carbon dioxide is ensured by the simultaneous effects of putting under vacuum and elution under depression of the gas coming from the desorption of the beds of molecular sieves of the two adsorbers of each adsorption line.

The device described comprises two lines of adsorbers. The number of lines of adsorbers is dependent on the diagram of pressures on the one hand and on the other on the necessity of ensuring a continuous flow-rate. The presence or the absence of buffer-chambers and also their volume has therefore an influence on the number of adsorption lines.

Thus, by way of information, in the case where the duration of the production is of the order of 30 seconds for a total period of 90 seconds (the duration of the period under vacuum being 45 seconds), it is possible to eliminate the buffer-chambers in the case where three adsorption lines are employed.

In Table I below, there are indicated results obtained from the installation shown in FIG. 1, following the method of operation described above (FIG. 2). The total volume contained in each of the adsorbers 11 and 11' is 2.2 liters, consisting of 0.5 liter of activated alumina and 1.65 liters of molecular sieve 5A, the adsorbers 12 and 12' each containing 0.85 liter of molecular sieve 5A.

In the examples 1 to 7 enumerated in Table I below, the rise in pressure has been carried out in two phases, respectively the front rise which consists in introducing purified gas through the outlet zone $5s$ into the adsorbers 11 and 12 (through the conduit 6', the valve $V_4$, the conduit 13 and the valve $V_2$) until there is obtained a pressure equivalent to that of the buffer-chamber 7 in the adsorbers 11 and 12; and the inflation phase which consists of introducing into the adsorber 11 through the introduction zone $5i$ (through the conduit 4 and the valve $V_1$, the valve $V_2$ being closed) until there is obtained a pressure equivalent to that of the buffer-chamber 3 in the adsorber 11.

Figure 3:
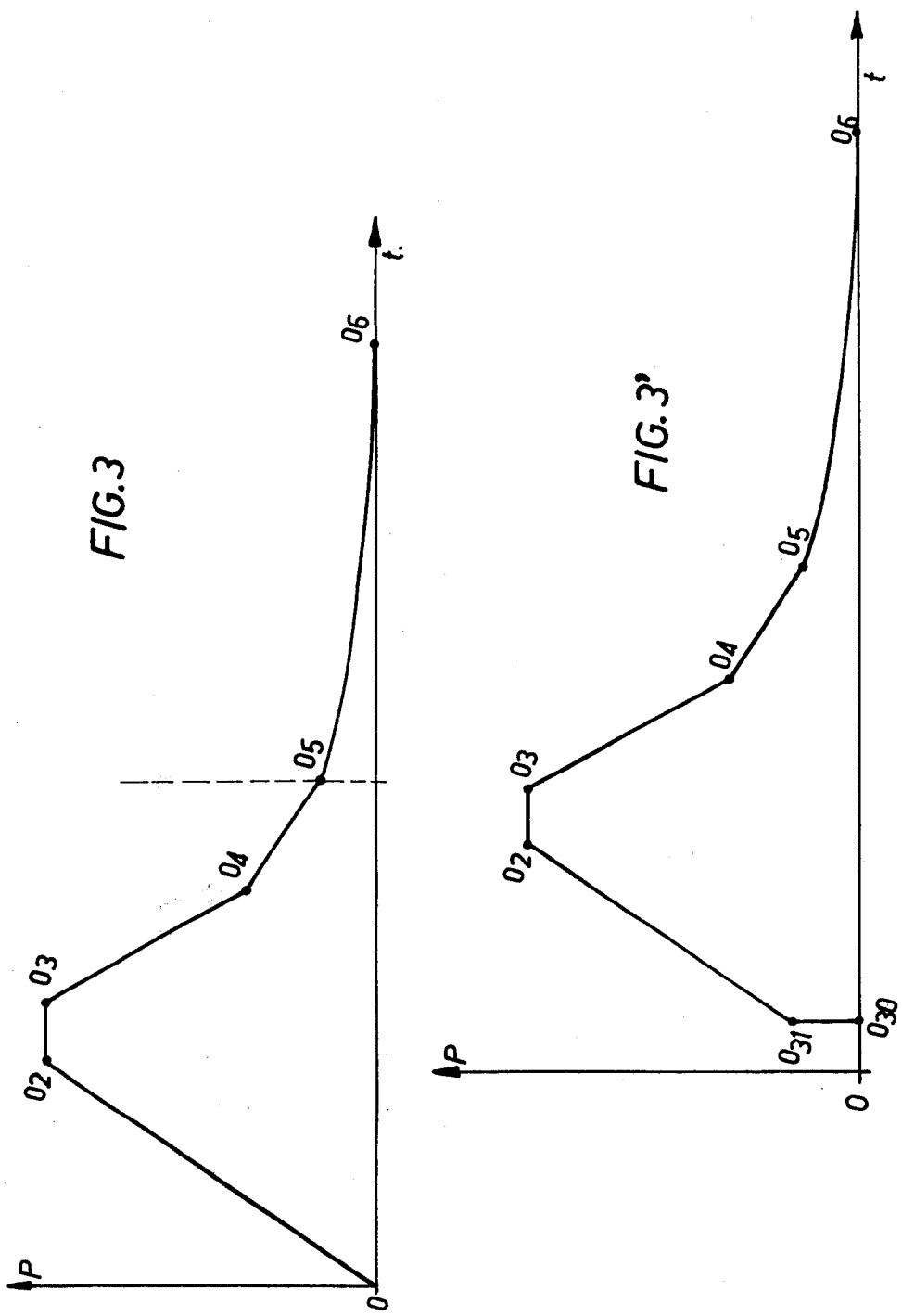

It is however possible to carry out the front rise phase only in the adsorber 12, the valve $V_2$ remaining closed, and carrying out, at least partly and simultaneously in the adsorber 11, an inflation intended to increase the pressure in this adsorber 11 to a value of the order of 6 bars. In the diagram of FIG. 3, applied to the adsorber 11, it is seen that the point $O_1$ shown on the diagram of FIG. 2 has been eliminated. The sector $O-O_2$ represents the inflation phase of the adsorber 11.

about 2 bars, while an inflation is carried out in the adsorber 11 (sector $O_{30}-O_2$, FIG. 3).

The valve $V_4$ is then closed, the operation of the installation continuing, following the method described above. In the diagram of FIG. 3', applied to the adsorber 11, it is seen that while the first part of the front rise takes place in the adsorber 12, nothing happens in the adsorber 11 $0-O_{30}$, FIG. 3). The sector $O_{30}-O_{31}$ corresponds to the stage during which, the valve $V_2$ being open, an equilibrium of pressure is produced between the adsorber 11 and the adsorber 12 (point $O_{31}$).

The front rise phase may also be carried out up to the creation in the adsorbers 11 and 12 of a predetermined pressure lower than the pressure existing in the buffer-chamber 7. The rise in pressure is then effected by inflation by means of the gas to be treated until respective pressures of 2 bars and 6 bars are obtained in the adsorbers 12 and 11.

It is of course also possible to connect the buffer-chamber 7, not only to the adsorber 12 but also to the adsorber 11 (form of construction not shown) and to carry out the front rise directly in the two adsorbers while leaving the valve $V_2$ closed.

The front rise is interrupted when the pressure reached in the two adsorbers is the pressure of the buffer-chamber 7. The inflation of the adsorber 11 is then carried out until the pressure of the buffer-chamber 3 is obtained.

By directly connecting the two adsorbers 11 and 12 to the buffer-chamber 7, it is also possible to raise the front in these two adsorbers until there is obtained a predetermined pressure lower than the pressure existing in the buffer-chamber 7. The valve $V_4$ is then closed and the valve (not shown) provided on the conduit (not shown) connecting the buffer-chamber 7 to the adsorber 11 is also closed. The valve $V_1$ is then opened, together with the valve $V_2$, and the adsorber 12 is inflated through the adsorber 11 up to the pressure of the buffer-chamber 7. The valve $V_2$ is then closed and the

TABLE I

| EXAMPLE | Introduction Pressure (bar abs.) | Pressure at end of vacuum (mm.Hg) | Front rise pressure (bar abs.) | Extraction pressure (bar abs.) | Volume extracted during vacuum (liters) (+) | Volume used for front rise (liters) (+) | Volume extracted during isobar extraction (liters) (+) | Volume extracted during expansion extraction | Volume put to air | Rate of extraction of oxygen % | Rate of production % | Energy consumed in Wh per MCE (+) |
|---|---|---|---|---|---|---|---|---|---|---|---|---|
| 1 | 6 | 50 | 2.0 | 2.3 | 17.2 | 16.1 | 9 | 13.1 | 13.4 | 69 | 88.2 | 885 |
| 2 | 6 | 50 | 2.0 | 2.3 | 16.6 | 16.1 | 9 | 13.0 | 13.2 | 72 | 93 | 878 |
| 3 | 6 | 50 | 2.0 | 2.3 | 16.6 | 16.2 | 10 | 13.0 | 13.2 | 75 | 89 | 896 |
| 4 | 6 | 100 | 2.5 | 3.0 | 15.9 | 20.0 | 15 | 10.4 | 20.4 | 50 | 82 | 136 |
| 5 | 4 | 160 | 1.8 | 2.0 | 14.0 | 15.8 | 14 | 10.0 | 11.9 | 64 | 55 | 844 |
| 6 | 4 | 160 | 1.8 | 2.0 | 13.8 | 15.3 | 13 | 9.5 | 11.8 | 63 | 60 | 786 |
| 7 | 4 | 160 | 1.8 | 2.0 | 14.0 | 14.4 | 11 | 8.0 | 11.8 | 55 | 75 | 850 |
| 7 | 4 | — | 1.8 | 2.0 | — | 7.0 | 3 | 10.2 | 10.6 | 60 | 45 | 822 |

(+) MCE = Nm³ of pure oxygen giving by mixture with air an equivalent quantity of enriched air having the same content of oxygen.

It is also possible to carry out the front rise phase in the adsorber 12 only, the valves $V_1$ and $V_2$ remaining closed.

When the pressure reached in the adsorber 12 is that of the buffer-chamber 7, the valve $V_2$ is opened (point $O_{30}$ of FIG. 3) in order that the constituent having been adsorbed, which is carried away by the front rise effected in the adsorber 12 towards the portion of the adsorber 12 opposite to the inlet of the purified gas, may pass practically wholly into the adsorber 11. The valve $V_2$ is then closed (point $O_{31}$ of FIG. 3) and the front rise then continues in the adsorber 12 until the pressure is inflation of the adsorber 11 is continued.

Figure 4:
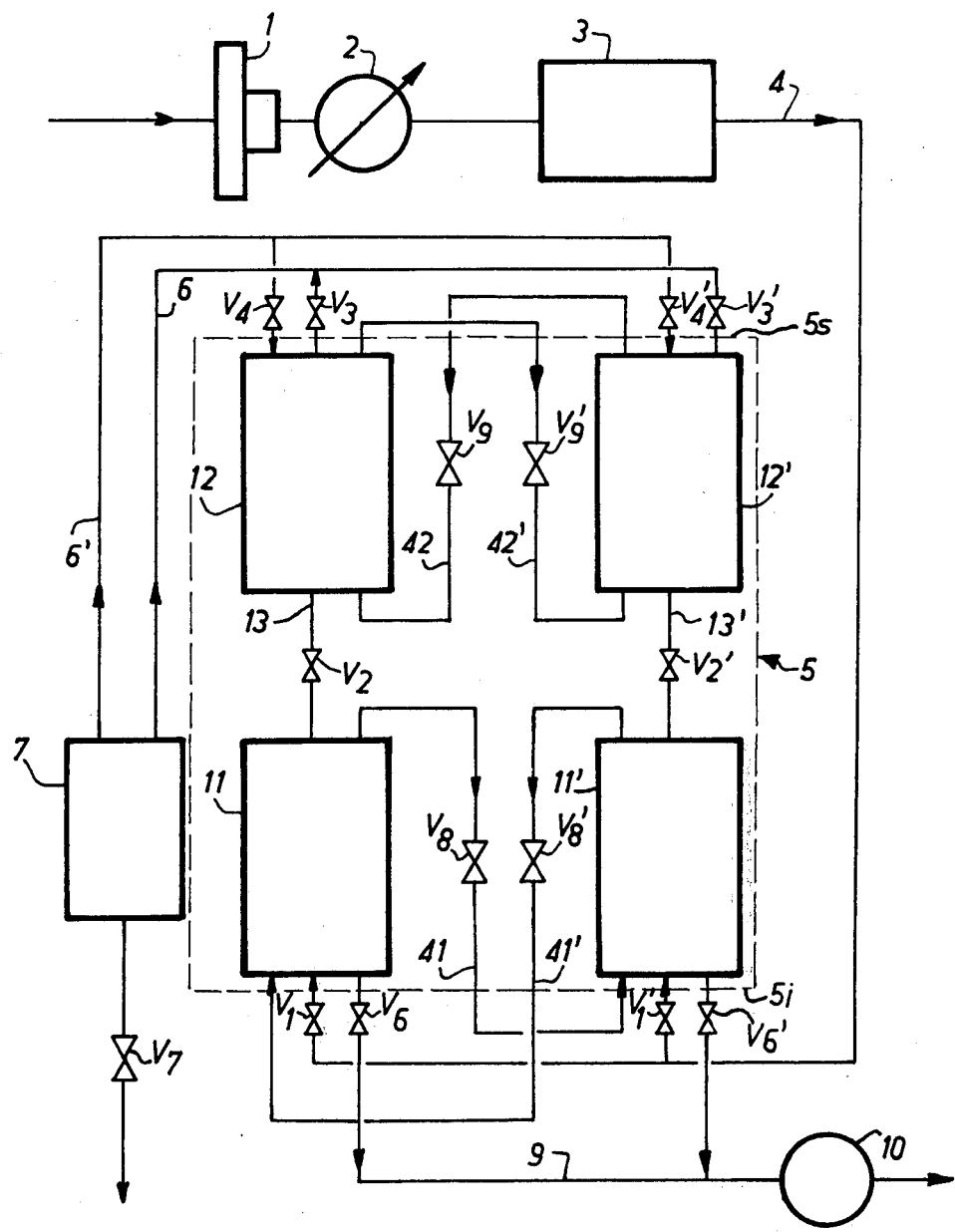
FIG. 4 shows diagrammatically a second adsorption installation similar to that of FIG. 1, enabling the corresponding adsorbers of the two adsorption lines to be balanced.

The installation shown in FIG. 4 is similar to that illustrated by FIG. 1. It comprises however balancing conduits 41 and 41' provided with valves $V_8$ and $V_8'$, connecting respectively the introduction zone $5i$ of each of the adsorbers 11 and 11' to the opposite zone respectively of the adsorbers 11' and 11. Similarly, it comprises conduits 42 and 42' provided with valves $V_9$ and $V_9'$ connecting together the opposite extremities of the adsorbers 12 and 12'.

In addition, the conduit 8 for connecton to air and the valves $V_5$ and $V_5'$, arranged on this valve are eliminated.

The relative dimensions of the adsorbers are also different from those given for the adsorbers of FIG. 1.

The installation shown in FIG. 4 permits the prevention of possible losses due to the connection to air and to ensure partial recovery of the gas leaving the adsorber during the connection to air, this portion of gas being utilized to increase partly the pressure in the other adsorber, freed from the impurities of the previous cycle.

In fact, at the moment of closure of the extraction valve $V_3$, the front of impurities has not gone beyond this valve. This front is distributed over a certain volume of adsorbent and is characterized by a certain gradient such that the gas available in the adsorber immediately in contact with the extraction valve is purified and contains a large proportion of the gas to be produced.

The connection to air of this gas involves a considerable loss, and in order to diminish this loss, a partial recovery is ensured by putting the two adsorbers into communication in the concurrent flow direction, that is to say in the direction of circulation of the gas to be treated, in order to effect the inflation of one of the adsorbers.

When the equilibrium is completed, the valves $V_8$ and $V_9$ are closed and the valve $V_4$ and the valve $V_1$ are opened, simultaneously carrying out a rise of front in the adsorber 12 and an inflation in the adsorber 11. It is of course possible to carry out a front rise simultaneously in the adsorbers 11 and 12. In this case, the adsorber 12 is coupled to the buffer chamber 7 and the adsorber 11 is connected to a chamber (not shown) containing a certain volume of the purified gas obtained, brought up to the pressure existing in the chamber 3 by any appropriate means.

It would also be possible to carry out an equilibrium of the pressures only between the adsorbers 12 and 12' for example. It is then possible to carry out a front rise simultaneously in the adsorbers 11 and 12 for example, the valves $V_4$ and $V_2$ being opened. When the pressure of two bars corresponding to the pressure existing in the buffer-chamber 7 is reached, it is possible to carry out the balancing of the two adsorbers 11 and 11', the valves $V_4$ and $V_2$ being closed and the valve $V_8$ for example being opened. When the equilibrium is complete, the inflation of the adsorber 11 is effected by closing the valve $V_8$ and opening the valve $V_1$.

After the balancing of the adsorbers 12 and 12' and the front rise in the adsorbers 12 and 11 being carried out up to the pressure of two bars, it is of course possible, instead of proceeding to the balancing indicated between the two adsorbers 11 and 11', to carry out directly the inflation of the adsorber 11. It is of course also possible to carry out simultaneously the front rise (following the balancing) in the adsorber 12 and the inflation necessary for the rise in pressure in the adsorber 11, the equilibrium between the adsorbers 11 and 11' on the one hand and 12 and 12' on the other having been carried out simultaneously.

It is also possible to carry out the rise in pressure by inflation up to an intermediate pressure, followed by a front rise. This method of operation may be followed in an installation such as that shown in FIG. 5. The adsorption zone 5 is in this case constituted by two adsorbers, 51 and 52 respectively. It is assumed that the extraction is carried out at constant pressure and therefore that the pressure in the buffer-chamber 7 is the same as that in the buffer-chamber 3.

The rise of pressure is obtained by inflation of the adsorber 5i until an intermediate pressure is reached, for example of the order of 4.5 bars.

The valve $V_1$ opened for this inflation, is then closed and a front rise is carried out in the adsorber 51, the valve $V_4$ being opened. When the pressure obtained in the adsorber 51 is 6 bars, the valve $V_4$ is closed and the valves $V_1$ and $V_3$ are opened; the adsorber is operating with constant pressure extraction.

When operating by inflation followed by a front rise, the effect of the front rise is not as complete as in the case where the first phase of the pressure rise is a front rise, due to the volume of impurities which the front is caused to raise. It follows that the gas extracted comprises a content of impurities intermediate between that observed without a rise in front and that observed with a rise in front in the first phase of the pressure rise.

The front rise following the inflation permits the recovery of a certain volume of gas which becomes available at a certain moment of the cycle at any desired point, and at a pressure lower than the constant pressure without re-compression.

In consequence, it is possible to operate by balancing the pressure between two adsorbers, which enables a gas too rich in gas to be produced to be put back into circuit.

Figure 6:
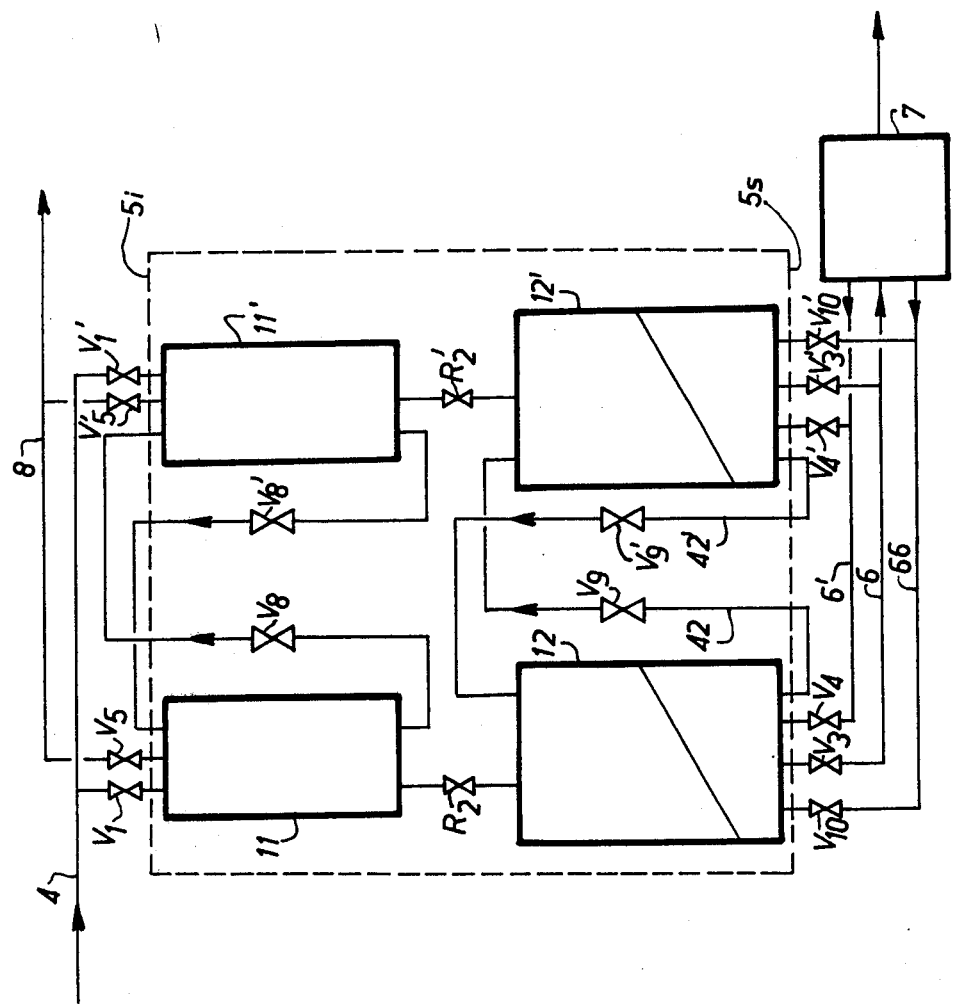
FIG. 6 shows a fourth adsorption installation in which each adsorption line comprises two adsorbers working at the same pressure.

FIG. 6 shows another form of embodiment of an installation according to the present invention.

This installation has a certain number of similarities to that shown in FIG. 4, from which it differs essentially by the fact that the pressure existing in the two adsorbers is the same, and therefore that it is not necessary to arrange an expansion valve on the conduits 13 and 13', only cocks, $R_2$ and $R_2'$ respectively being provided. The two adsorbers of each line operate at the same pressure equal to the introduction pressure of the gas to be treated.

It further differs from the installation of FIG. 4 by the fact that an additional conduit 66 connects the buffer-chamber 7 to the outlet zone 5s of the adsorbers 12 and 12' through the intermediary of the valves $V_{10}$ and $V_{10}'$, and also by the fact that the adsorbers are not connected to a vacuum pump.

Figure 5:
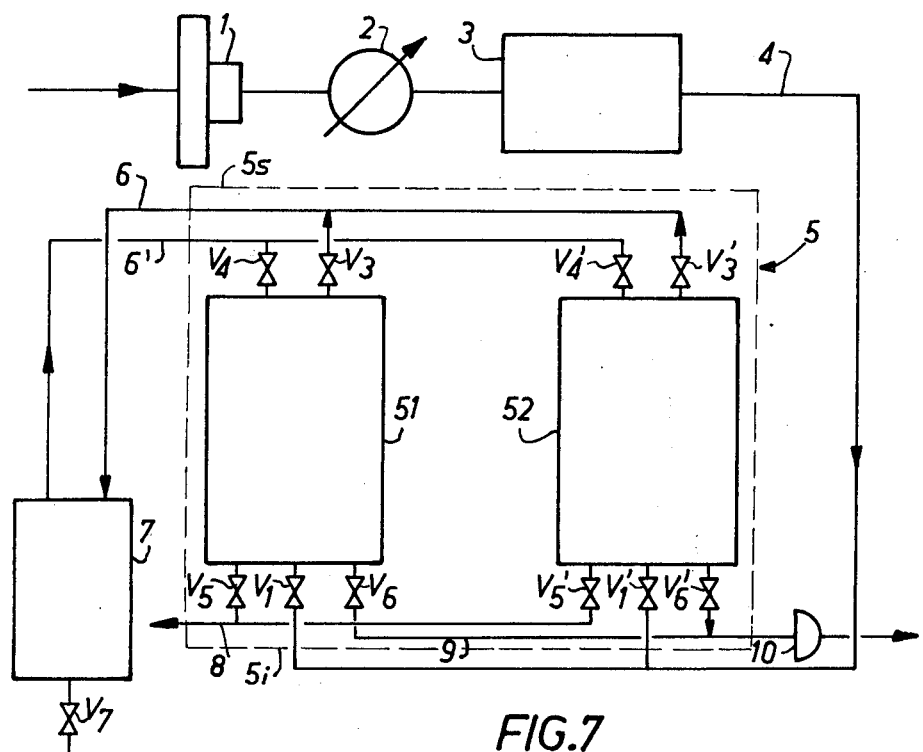
FIG. 5 shows diagrammatically a third adsorption installation in which each adsorption line comprises one adsorber only.

The installation permits an equilibrium similar to that described for the installation of FIG. 5 and a connection to atmosphere of the installation by the conduit 8.

Regeneration of the adsorption lines is carried out by simultaneous elution and connection to atmosphere.

The eluent gas is part of the pure gas produced brought to the adsorbers through the conduit 66 and the valves $V_{10}$ and $V_{10}'$, these valves being regulated to a definite flow-rate.

The eluent facilitates the desorption of the adsorbed gases.

In the installation shown in FIG. 6, there is treated a mixture containing:
$H_2 = 61.5\%$
$N_2 = 20.5\%$
$CH_4 = 11.7\%$
$A = 5.2\%$
$NH_3 = 1.1\%$
for the purpose of production of hydrogen, in which the tolerances of impurities are 2000 vpm, the balancing and the front rise described above being carried out. The installation operates with constant-pressure extraction.

The examples or cycles described in Table II (examples 8 and 12) are carried out, the elution (ELU), the connection to air (MA) and the constant-pressure period (ISO) being effected in all cases. The operation of connection to vacuum is eliminated, and in this particular appliction, the vacuum pump and the conduit 9 and the valves $V_6$—$V_6'$ are eliminated.

The very low rate of extraction obtained for the cycle of example 8 makes necessary a recovery of gas which is always possible by balancing.

In the cycle of Example 9, a front rise takes place in a first period over the adsorber 12 only. The quantity of gas recovered is that corresponding to an expansion from 26 to 16 bars. The rate of extraction reaches 58.5%. In the cycle of Example 10, the two periods are reversed on the adsorber 12 and the efficiency passes from 58.5 to 61%.

In the cycle of Example 11, the front rise is effected in the two adsorbers, which brings the efficiency up to 63.8%.

In the cycle of Example 12, the pressure of the constant-pressure expansion was brought up to 31 bars abs., which ensures a front rise to 26 bars by extraction of pure hydrogen from the storage buffer chamber at 31 bars, providing for a possible pressure drop of 5 bars in this buffer-chamber.

In certain cases, it is necessary to carry out only a limited balancing in some cycles. It is in fact known that is certain cycles, in order to ensure high pressure at distribution, the expansion is not employed (the case of Example 12) or is only carried out over a few bars. In this case, if the pressure balancing is ensured between two adsorbers, the pressure variation being large, the impurities may pass in such quantities that the average mixture is poorer in gas to be produced than the gas treated. In this case, the putting into communication of the two adsorbers must not be prolonged until the pressures are in equilibrium, but is stopped at a pre-determined pressure corresponding to a substantial recovery of the gas to be produced.

similar to those which have been des cribed above for the case where the lines consist of two adsorbers.

In the case of a line of adsorbers composed of three adsorbers the pressures of which are decreasing, it is possible to raise the front by means of the gas produced until the production pressure of the gas to be produced is reached, or a lower pressure, in the three adsorbers; the front rise may be effected only in the first two of the adsorbers, independent rises of front may be carried out for each adsorber, etc. Similarly, it is possible to carry out a balancing effect in the three adsorbers and the regeneration by elution may be produced in the three adsorbers simultaneously or in two adsorbers only. In particular, it is possible to effect in the last adsorber (in the direction of circulation of the gas to be treated) an elution, the gaseous fraction leaving this adsorber being brought separately into the first two adsorbers, in order to raise the fronts in these two adsorbers. In this case, the last of the adsorbers is connected to each of the preceding adsorbers.

The installation shown in FIG. 6 makes it possible however to proceed successively with a constant-pressure extraction (the pressure existing in the two adsorbers during this stage being equal to the introduction pressure of the gas to be treated), then to an extraction with expansion, during the course of which the supply of gas to be treated is interrupted, the expansion being continued to a pre-determined intermediate pressure.

Figure 7:
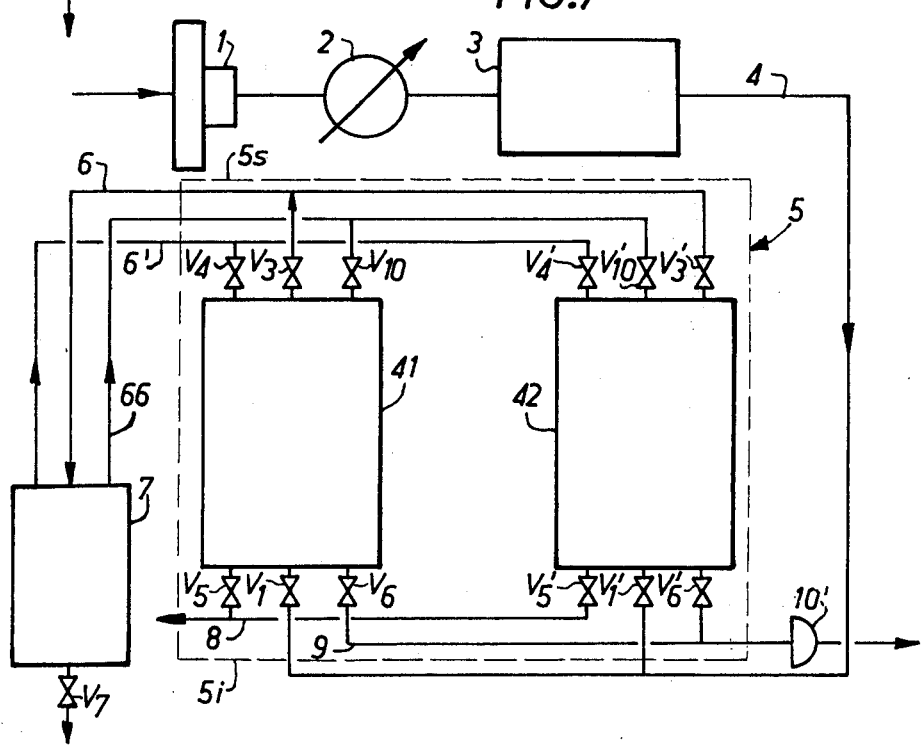
FIG. 7 represents a fifth adsorption installation, in which each adsorption line comprises a single adsorber.

FIG. 7 shows another form of embodiment of an installation comparable with that shown in FIG. 4, but further comprising a conduit 66 and valves $V_{10}$ and $V_{10}'$, similar to those shown in FIG. 6.

This installation enables the adsorbents to be regenerated by elution, that is to say by carrying-off the impurities with a gas which does not contain any, this elution being produced due to the difference of the partial pressures of the impurities between the gas remaining in the

TABLE II

| EX-AMPLE | AD-SORBER | | | | | | | | Hydrogen extraction rate | Impurities (vpm) | | Hydrogen |
|---|---|---|---|---|---|---|---|---|---|---|---|---|
| | | | | | | | | | | Argon | Nitrogen | |
| 8 | 11 | RF 1-6 | | Int 6-25 | Iso 25 | | MA 26-1 | Elu | 33 % | 2000 | | 99.8 % |
| | 12 | RF 1-6 | | Int 6-25 | | | MA 26-1 | Elu | | | | |
| 9 | 11 | Eq 1-13 | | Int 13-26 | Iso 26 | Eq 26-13 | MA 13-1 | Elu | 58.5 % | 160 | 392 | 99.945 % |
| | 12 | RF 1-6 | Eq 6-16 | Int 13-26 | Iso 26 | Eq 26-16 | MA 16-1 | Elu | | | | |
| 10 | 11 | Eq 1-13 | | Int 13-26 | Iso 26 | Eq 26-13 | MA 13-1 | Elu | 51.0 % | 160 | 472 | 99.936 % |
| | 12 | Eq 1-13 | RF 13-26 | | Iso 26 | Eq 26-13 | MA 13-1 | Elu | | | | |
| 11 | 11 | Eq 1-13 | RF 13-26 | | Iso 26 | Eq 26-13 | MA 13-1 | Elu | 63.8 % | 575 | 990 | 99.643 % |
| | 12 | Eq 1-13 | RF 13-26 | | Iso 26 | Eq 26-13 | MA 13-1 | Elu | | | | |
| 12 | 11 | Eq 1-16 | RF 16-26 | Int 26-31 | Iso 31 | Eq 31-16 | MA 16-1 | Elu | 63.7 % | 558 | 970 | 99.847 % |
| | 12 | Eq 1-16 | RF 16-26 | Int 26-31 | Iso 31 | Eq 31-16 | MA 16-1 | Elu | 64.5 % | 854 | 1005 | 99.814 % |
| | | | | | | | | | 65.5 % | 2050 | 2770 | 99.518 % |
| | | | | | | | | | 66.6 % | 3800 | 4970 | 99.123 % |

RF Front rise
Iso Constant pressure period
Int Introduction of gas to be treated Eq Balancing between columns 11 and 11' or 12 and 12'
MA Connection to atmosphere
Elu Elution
The figures represent the pressures reached in bars absolute.
Example RF 13-26 represents the front rise from 13 to 26 bars absolute.

In the forms of embodiment shown, the adsorption zone is formed by two adsorption lines working alternately. In the forms of embodiment of FIGS. 1, 4 and 6, each adsorption line is composed of two adsorbers 11-12 in series.

It is clear that each line may comprise a greater number of adsorbers and may especially consist of three or four adsorbers in series, the pressures existing in the various adsorbers being constant or different and being preferably successively decreasing in the direction of circulation of the gases to be treated. The operations which can be carried out on the various adsorbers are adsorber and the eluent gas.

In the installation of FIG. 7, the influence of the final pressure of the front rise on the purity of the gas obtained is studied. If the starting mixture of gases has the following composition:

$H_2$ = 65.0%
$CO_2$ = 22.4%
$CO$ = 3.0%
$CH_4$ = 3.0%   A = 0.9%   $N_2$ = 5.7%   $N_2$ = 5.7% the hydrogen obtained has a higher purity, increasing as the pressure at the end of the front rise period becomes higher, as shown by the results indicated in Table III below (Examples 13 to 16)

TABLE III

| EXAMPLE | ISOBAR PRESSURE (bars abs.) | FRONT RISE (bars abs.) | H₂ IMPURITIES CONTENT N₂ (vpm) | A (vpm) |
| --- | --- | --- | --- | --- |
| 13 | 21 | 6 | 25 | 250 |
| 14 | 21 | 10 | 15 | 30 |
| 15 | 26 | 6 | 65 | 750 |
| 16 | 26 | 11 | 23 | 63 |

The extraction of the impurities by pumping alone is only effected on the gases contained in the adsorber. It follows that the impurities are desorbed in the inverse order of their facility of adsorption, and that the largest quantities of gas to be extracted are at the lowest pressures, which necessitates vacuum pumps with a large swept volume. If, during the vacuum, a gas other than the impurities and which is generally the gas produced, is injected into the adsorber, a partial pressure is created in this injected gas and a certain volume of impurities is thus carried away.

This technique enables either the purity of the gas produced to be improved, or the swept volume of the vacuum pump to be reduced.

If the swept volumes of the vacuum pumps utilized in the installations of FIG. 5 and 7 are compared, applied to the production of hydrogen from the mixture having the composition as indicated above, the vacuum pump 10' employed in the installation of FIG. 7 may have a swept volume reduced by half as compared with that of the pump shown in FIG. 5.

A comparative test carrier out with the aid of the installation of FIG. 5 (without elution) and by means of the installation of FIG. 7 (with elution) gives the results indicated in Table IV below.

It is found that there is a simultaneous gain in the value of the vacuum obtained (although the swept volume of the vacuum pump 10 ' is reduced by half compared with that of the pump 10 of FIG. 6) and in the purity of the hydrogen produced. The results thus obtained confirm the fact that the eluent hydrogen facilitates the desorption of the adsorbed gases.

TABLE IV

| EXAMPLE | EXTRACTION | ELUTION (*) | FINAL VACUUM in column mm.Hg | IMPURITY CONTENT A (vpm) | N₂ (vpm) |
| --- | --- | --- | --- | --- | --- |
| 17 (of FIG. 5) | YES | NO | 27.8 | 345 | 64 |
| 18 (of FIG. 7) | YES | YES | 16.4 | 238 | 36 |

(*) Volume of elution: 3% of the production.

FIG. 8 represents an installation similar to that of FIG. 4 in which an elution is carried out simultaneously with putting under vacuum. The swept volume of the pump 10" of FIG. 8 is reduced as compared with that of the pump 10 of FIG. 4.

In the form of embodiment shown in FIG. 8, it is possible to short-circuit completely the stage of putting under vacuum, and in this case no vacuum pump will be employed and the regeneration is then produced solely by elution and connection to atmosphere (operation comparable to that indicated for the installation of FIG. 6 as regards the elution).

In this case, the results obtained on an adsorption line comparable with that which has made it possible to obtain the results indicated in Table 1 above for the case of Example 7', which corresponds to that in which the vacuum is not created on the line of adsorbers 11–12, but in which only an elution is effected.

Figure 9:
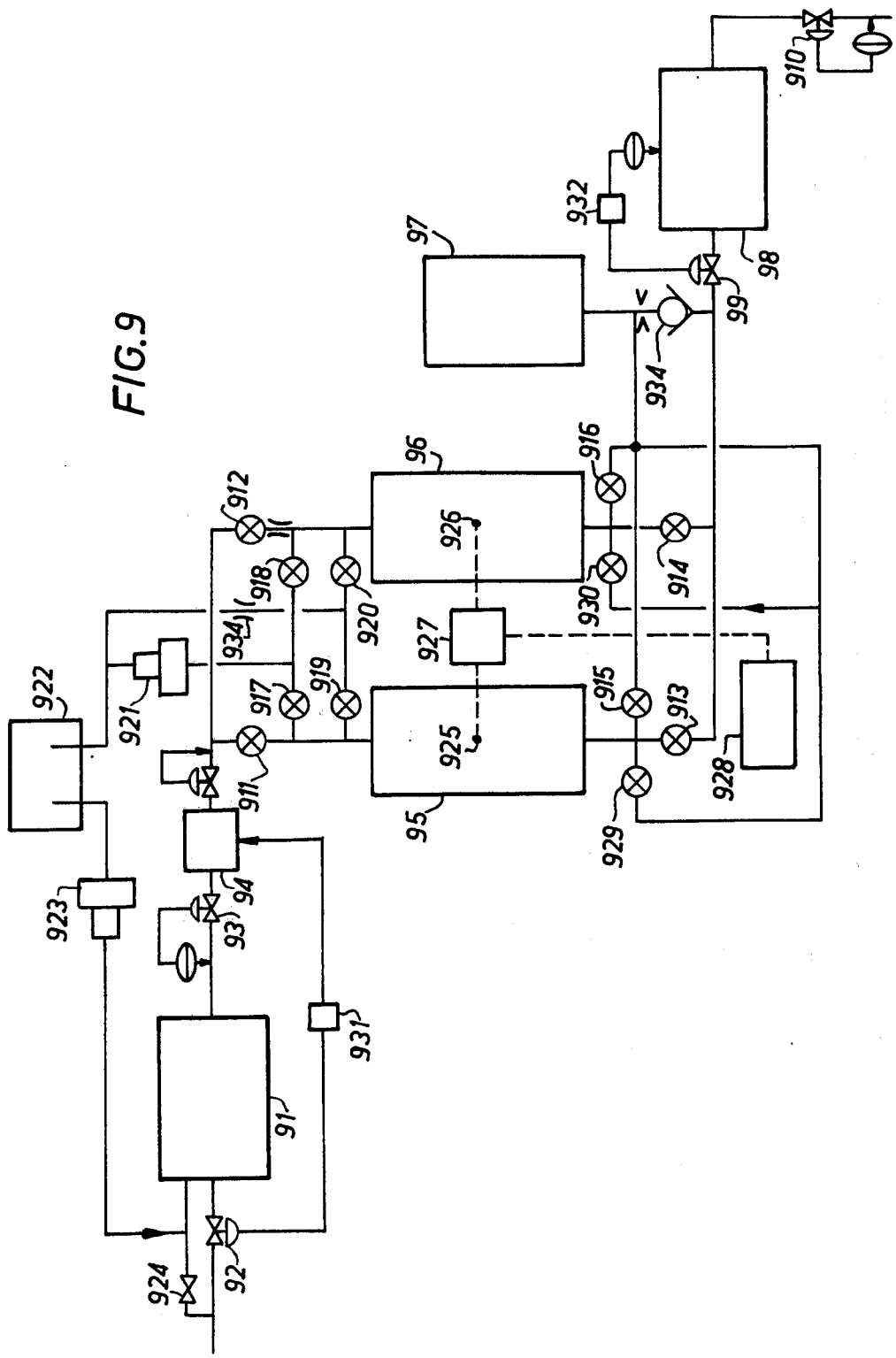
FIG. 9 shows a seventh adsorption installation for the purification of hydrogen obtained from a steam reforming unit.

The installation shown in FIG. 9 comprises a steam reforming unit 91. The natural gas is admitted into this unit 91 through the regulation valve 92. The gas obtained, the approximate composition of which is:

$H_2 = 70\%$
$CO_2 = 9\%$
$CO = 12.5\%$   $CH_4 = 4.5\%$   $N_2 = 4.0\%$ and which is saturated with moisture, is then brought, after passing into a regulation valve 93 maintaining a constant pressure in a buffer-chamber 94 which in turn supplies the adsorption unit, into the adsorbers 95 and 96 which work alternately. Thi buffer-chamber 94 permits a constant and continuous flow-rate through the valve 93, whereas the admission of gas into the adsorbers 95 and 96 by the valves 911 and 912 is discontinuous. This results in a systematic variation of pressure during each cycle in this buffer-chamber 94.

The regulation valve 92 automatically ensures the supply of the reforming unit in such manner that the extreme values of the pressure in the chamber 94 remain constant irrespective of the flow rate passed by the valves 911 and 912.

Figure 10:
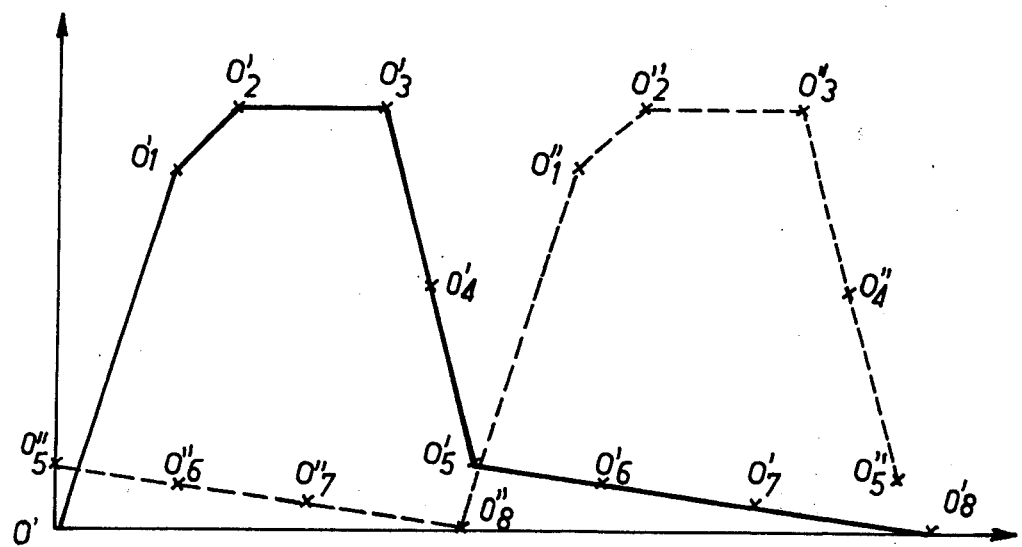
FIG. 10 shows the evolution of the pressures in one adsorber (curve in full lines) an in another adsorber (curve in broken lines) of the installation shown in FIG. 9.

The diagram of FIG. 10 indicates the operation of the adsorption device, the abscissae representing the time and the ordinates representing the pressures. At zero time, represented by O', the adsorber 95 is under vacuum.

A partial pressurization (front rise) is first ensured by admitting pure hydrogen in counter-flow to the extraction of the gas produced coming from the buffer-chamber 97, previously filled up to a pre-determined pressure (the stage represented by the straight line $O'-O_1'$ by the diagram), the valve 915 being open;

The pressurization is completed (inflation) by admitting the extracted mixture to be treated into the buffer-chamber 94 in concurrent flow with the extraction (straight line $O_1'$, $O_2'$), the valve 915 being closed and the valve 911 open;

During the phase represented by the straight-line $O_2'$, $O_3'$ (constant pressure extraction), the pressure remains constant while leaving open the admission valve 911 of the mixture to be treated and the extraction valve 913. The hydrogen produced is directed to the buffer-chambers 97 and 98;

The depressurization is started by closing the valve 911 while maintaining the valve 913 open (extraction with expansion). This closure is determined by the appearance of the "front" of impurities at a given point in the adsorber 95 (analysis sampling 925–926, catharometer 927). This depressurization (straight-line $O_3'$, $O_4'$) is stopped at a pre-determined pressure by closing the valve 913. The gas produced is collected at 98;

The adsorber 95 is de-pressurized down to atomspheric pressure by opening the valve 919. The gas is collected in a gasometer 922 (straight-line $O_4'$, $O_5'$). This constitutes in a way a connection to atmosphere with recovery;

The valve 919 is then closed and the regeneration of the adsorbent is completed by extraction of the gases by the vacuum pump 921, which necessitates the opening of the valve 917 (section $O_5'$, $O_8'$ of the diagram). The extracted gas is delivered into the gasometer 922;

For a fraction of the period of putting under vacuum, there is injected in counter-flow to the extraction, a small volume of gas by extraction from the chamber 97 by opening of the valve 929, which has the consequence of causing a slight reduction of the speed of putting under vacuum (portion $O_6'$, $O_7'$ of the diagram), but which facilitates the regeneration of the adsorbent by elution of the adsorbed gas.

At the point $O_8'$, the adsorber 95 is in the same condition as it was at the point O.

A fresh production cycle can therefore be effected.

The adsorber 96 is subjected to the same pressure cycle, but this cycle is displaced with respect to that of the adsorber 95 due to the regulation described below in order to ensure the continuous operation of the vacuum pump and to reduce to a minimum the dead times of admission of gas to be treated and of production of pure gas. One of the consequences of these objects is to provide a time of putting under vacuum equal to the sum of the times of the other stages in order to utilize the capacity of the vacuum pump to the maximum extent.

In the description of the regulation, the various stages will be denoted by the following descriptions:
Pressure rise
 $O'-O_1'$ : front rise;
 $O_1'-O_2'$ : inflation.
Stage
 $O_2'-O_3'$ : contant pressure extraction or constant pressure;
 $O_3'-O_4'$ : extraction with expansion or expansion;
 $O_4'-O_5'$ : connection to atmosphere;
 $O_5'-O_8'$ : putting under vacuum;
 $O_6'-O_7'$ : elution under vacuum.

The particular features of this cycle are as follows:

The front must not be raised to the isobar pressure and the front rise is effected by means of the very pure gas collected at the beginning of the constant pressure extraction in the buffer-chamber 97.

The front rise is carried out up to a pressure of the order of 50% of the isobar pressure. The pure gas utilized is collected during the preceding production, at the beginning of the isobar period, during which the gas is extracted at its greatest purity. There is in fact observed a very slight deterioration of the content during extraction with expansion;

The production is adjusted to the consumption by controlling the duration of the isobar extraction in dependence on the evolution of the pressure in the downstream chamber;

The gas to be treated is wholly employed. In fact, the residual gases (resulting from the connection to atmosphere and from the vacuum) collected in the gasometer 922 are again taken by the compressor 923 and re-utilized to furnish the heat necessary for the reforming unit. The valve 924 permits the introduction into the re-forming unit 91 of a portion of the fuel necessary for heating this unit, the residual gases taken by the compressor 923 being joined to the fraction of the mixture thus burned.

The installation shown in FIG. 9 is an installation with automatic regulation.

The automatic regulation has for its object:

To ensure the cycle of pressures by ensuring the opening and closure of the valves as a function of pre-determined critieria;

to control the production in dependence on the consumption;

to ensure a maximum extraction rate while maintaining the required purity of the gas produced;

to ensure all the operation safety measures required for an installation for producing hydrogen.

This latter object tends to discourage the use of electric regulation, except when no other solution exists. This is especially the case of certain analyzers (analysis of the gases by catharometry for example).

The valves are pneumatically operated, which has made it possible to effect their opening and closure by distributors which are in turn operated in the same manner.

This operation of the distributors is controlled by a pre-determined factor specified for each of the stages.

Assuming that the installation is in continuous working and that the isobar phase exists in the adsorber 95, at that moment, the admission valve 911 is opened, as is also the extraction valve 913. The extracted hydrogen is collected in the chamber 97 through a calibrated orifice such as 934, limiting the throughput, and up to the isobar pressure in the chamber 97, and simultaneously in the chamber 98 through a regulator 99. The adjustment of this regulator is a function of a reference pressure in the chamber 98 at a pre-determined point of the cycle.

As the production of hydrogen is discontinuous, the pressure in the chamber 98 depends on the instant of the cycle and on the consumption for which the pressure is regulated by the regulator 910.

Figure 11:
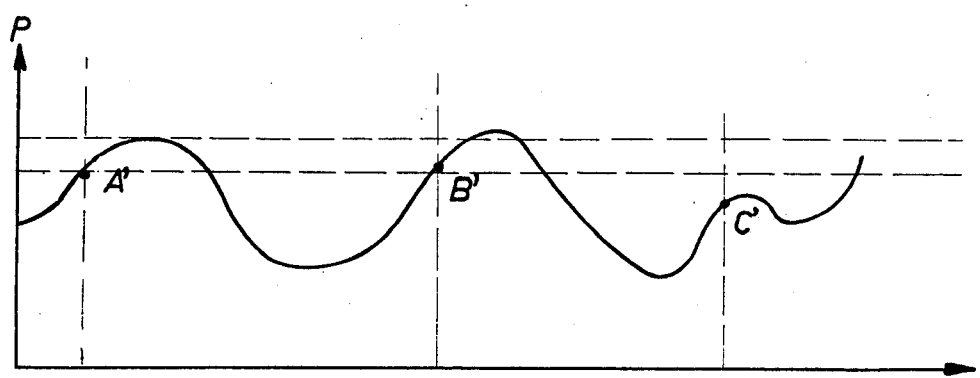
FIG. 11 shows the variations of pressure as a function of time in a buffer-chamber of the installation shown in FIG. 9, for the reception of the pure hydrogen produced.

The variation of pressure in the chamber 98 may take place for example as shown in FIG. 11. The pressure is checked at a pre-determined moment of the cycle; this moment may be the end of the isobar period, the end of the expansion, the maximum or minimum pressure in the buffer chamber or any other precise moment of the cycle. If the pressure P corresponds to a definite flow-rate of the regulator 99, and if at the moment of checking the pressure the latter has not varied (point A') the flow rate will remain the same for the following cycle. At the next check at the point B', the pressure slightly higher; the production has been greater than the consumption, the regulator will ensure a lower flow-rate. At the point C' on the contrary, the regulator enables a higher flow-rate to pass for the whole duration of the following cycle. The flow-rate is regulated at each production cycle for the duration of that cycle.

The flow-rate of hydrogen produced thus depends on the position of the regulator 99.

As this flow-rate is variable from one cycle to another, the impurities move at different speeds in the adsorber.

In order to ensure a maximum rate of extraction, while maintaining the desired content, the isobar phase is stopped at the moment when the front of impurities reaches a certain position in the adsorber 95.

The front occupying a certain volume of adsorbent which is a maximum for the largest flow-rate, these analysis points may be placed in a region where the content of impurities to be detected is large, several hundred or several thousand vpm. The analysis is thus facilitated and an analyzer of the catharometer type, suitably calibrated for the sum provided for the various impurities, has a sufficiently rapid response time to detect the front at the desired time.

In the diagram, the analysis points are shown at 925 and 926 and the catharometer at 927. The latter transmits an electric signal to a device 928 which acts on the pneumatic distributor which effects the closure of the valve 911.

The valve 911 being closed while the valve 913 remains open, the hydrogen continues to be extracted in expansion (straight line) $O_3'-O_4'$ of the diagram). The point $O_4'$ is detected by pressure. This detection causes the closure of the extraction valve 913 which effects the opening of the valve 919.

The putting to atmosphere of the gas remaining under pressure in the adsorber 95 must be slowed down so as to avoid attrition of the adsorbents and to eliminate the risk of fire of the mixture. A flow regulator 934' is therefore provided and this limits the speed of flow of the gas, while ensuring a passage of increasing size as and when the pressure falls in the adsorber 95.

The point $O_5'$ may be determined either by measuring the pressure in the adsorber or by measuring the time between the points $O_4'$ and $O_5'$. The method chosen determines a signal which causes the closure of the valve 919, which once closed causes the closure of the valve 918. The adsorber 95 is in fact in communication with the vacuum pump, since the installation is assumed to be in continuous operation. The closure of the valve 918 thus isolates the adsorber 96 from the vacuum pump. which acts by sending signals to permit the adsorber 95 to be put under vacuum by opening the valve 917 and the re-starting of a cycle of production by opening the valve 916 on the adsorber 96.

Following the cycle of the adsorber 95, the latter is in communication with the vacuum pump 921. The portion $O_6'-O_7'$ (elution during vacuum) is determined as a function of the time (time $O_5'-O_8'$) of putting under vacuum of the adsorber. The elution valve 929 is open at $O_6'$ and closed at $O_7'$.

The closure of the valve 917 (point $O_8'$) is caused by the closure of the valve 920 which puts the adsorber 96 to atmosphere.

The valve 917 being closed, the adsorbents contained in the adsorber 95 are regenerated and a fresh production cycle is started (point O' of the diagram), the opening of the front rise valve 916 being caused by the closure of 917.

The point O' may be determined either by time or by the pressure, and the method chosen determines a signal which closes the valve 929, this closure causing the opening of the valve 911.

The limitation of the flow-rate of pure hydrogen ensuring the front rise may be effected by means of a calibrated orifice.

The inflation (between the points $O_1'$ and $O_2'$) is controlled by measuring the pressure in the adsorber 95. When the extraction pressure is reached, the pressure detection signal opens the extraction valve 913.

The whole unit is again in an isobar period, as previously described.

The adsorber 96 has the same cycle as 95, the passage of the vacuum pump from one adsorber to the other being carried out at the end of the connection to atmosphere of the adsorber in course of depressurization.

The Table given below summarizes the half of the cycle as it has been described.

The variation of flow-rate observed in the buffer-chamber 98 and regulated through the intermediary of the regulator 99 associated with the apparatus 932 permitting the despatch of the pressure impulse at 99 must be accompanied by a similar variation of flow-rate in the production of the reforming unit. This latter variation can only be effected between 40% and 100% of the maximum production. It is regulated by observing the pressure existing in the chamber 94 at certain moments of the adsorption cycle and by using this pressure to modify the setting of the regulator 92 by means of the detector 931.

The residual gases collected in the chamber 922 are re-cycled by means of the compressor 932 and the valve 924 so as to supply the calories necessary to the reforming unit.

Another method of regulation of an adsorption installation consists of operating in accordance with the method indicated below.

Figure 12:
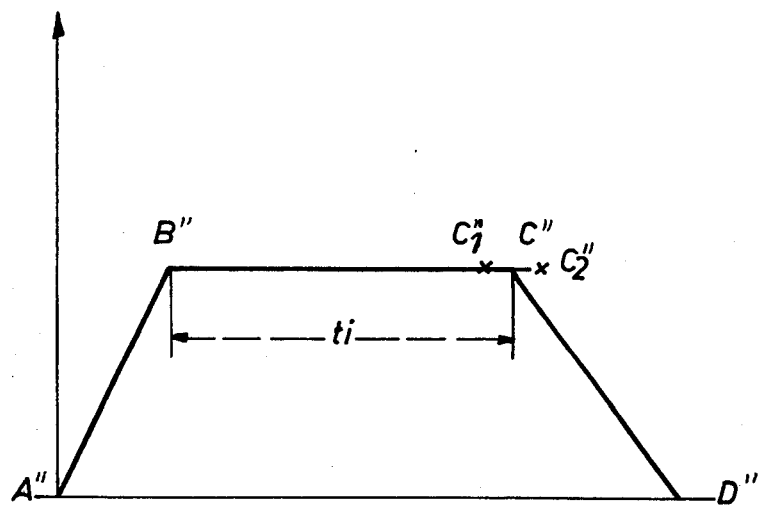
FIG. 12 shows the pressure variations in an adsorber of an eighth adsorption installation.

The diagram of FIG. 12 represents a pressure cycle for the production of super-oxygenated air by isothermal adsorption. An installation such as that shown in FIG. 5 may be employed.

TABLE V

| OPERATION | | VALVE ACTUATED | | |
|---|---|---|---|---|
| Adsorber 95 | Adsorber 96 | For adsorber 95 | For adsorber 96 | CONTROL SIGNAL |
| Isobar end | | 911 closed | | Detection front, 95 |
| Expansion | | | | |
| Expansion end | | 913 closed | | Pressure in 95 |
| Putting to air | | 919 open | | Closure of 913 |
| Putting to air end | | 919 closed | | Pressure in 95 |
| | Stopping of vacuum | | 918 closed | Closure of 919 |
| Putting under vacuum | | 917 open | | Closure of 919 |
| | Front rise | | 916 open | Opening of 917 |
| Beginning of elution | | 929 open | | Time from 917 opening |
| End of elution | | 929 closed | | Time from 929 opening |
| | End of front rise | | 916 closed | Pressure in 96 or time from 916 opening |
| | Admission | | 912 open | Closure of 916 |
| | Isobar extraction | | 914 open | Pressure in 96 |
| | Isobar end | | 912 closed | Detection of front, 96 |

The adsorption cycle shown comprises:

The rise in pressure from a given vacuum by the introduction of super-oxygenated air produced in a previous cycle in counter-flow to the direction of extraction (front rise). (A" B");

sweeping out the adsorbent by air at a pressure sufficient to compensate for the losses of pressure. (B" C");

the gas collected at the opposite extremity of the adsorber is super-oxygenated air (isobar stage);

the adsorbent is charged with nitrogen and the extraction is stopped. The adsorbent is then regenerated by pumping nitrogen and the adsorber may be subjected to a fresh production cycle. (C" D"). In the diagram of FIG. 12:

The sector A" B" corresponds to the front rise;

The sector B" C" corresponds to extraction at constant pressure;

The sector C" D" corresponds to the stage of regeneration by vacuum. The position of the point C" (corresponding to the interruption of the extraction) in time must be observed because of the rapid passage of the nitrogen front.

Thus, tests carried out in an installation such as that shown in FIG. 5 have made it possible to state that a variation of one and a half seconds in the duration of the constant pressure extraction causes the following modifications:

| Isobar time | Oxygen content | Extraction rate |
| --- | --- | --- |
| 39.5 sec. | 85% | 48.5% |
| 41.0 sec. | 74% | 52.5% |

These data make it possible to state that even a very strict control of the time is not sufficient to ensure a constant content of oxygen in the production; account must in fact be taken of the external conditions and in particular of the ambient temperature.

In fact, the adsorption diminishes as the temperature rises, so that a continuous control of the content is necessary in order to ensure a constant production.

This method of regulation is based on the precise determination of the time $t_1$ at the end of which the extraction valve is closed.

The principle of this regulation is as follows:

The time $t_1$ is given by a timing device. This latter receives a starting impulse at the point B'' and causes the opening of the extraction valve. At the end of the time $t_1$ the same timing device closes the extraction valve (point C'', FIG. 12).

During the time $t_1$, the super-oxygenated air produced has been stored in a buffer-chamber, and at the point C'' an oxygen analyser detects the average content of the extracted gas. This content is compared with the desired value. If the content detected is less than the desired value, this means that the nitrogen front has passed and that there is deterioration of the content by this front ($C_2''$). If, on the contrary the mean content is higher than the desired value (C''), this means that the constant pressure extraction has been stopped before the passage of the front.

In the first case $C_2''$ must be brought back to C'', and in the second case $C_1'$ to C''. The displacement is corrected by acting on the adjustment of the timing device by means of two small motors acting either in one direction or in the other for a very short controlled time. The displacement of the points $C_1''$ and $C_2''$ is a function of this controlled time.

If the difference between the desired value and the detected value is large, the correction may require a number of cycles; if the difference is very small, there will be alternately a displacement towards $C_1''$ and then towards $C_2''$. If the working time of the auxiliary motors is very short, the oxygen content will be practically constant.

The oxygen analyzer may be of any desired type, but it must have at least one adjustable contact which can be set to the desired value. It may also be provided with two adjustable contacts, which makes it possible to define the range of oscillation of the contents.

It will of course be understood that the invention is not restricted to the forms of embodiment shown but is capable of receiving numerous other alternative forms available to those skilled in the art and according to the applications considered, without thereby departing from the spirit of the invention.

Thus, during the constant-pressure extraction controlled by the evolution of the pressure in the chamber in which the purified gas is stored, an order to the outlet valve of the adsorber in operation enables the flow to be throttled; this results in a reduction of the speed in the adsorber and a reduction in the speed of displacement of the front.

In consequence, the rate of working of the unit is automatically adapted to the demand.

What we claim is:

1. A method of fractionation of a gaseous mixture by adsorption, utilizing at least one adsorption line including in an adsorption direction at least a first adsorber and a second adsorber, each adsorber comprising at least one adsorbent mass which preferentially adsorbs at least one constituent of said gaseous mixture, said method comprising at least one adsorption cycle carried out with at least one adsorption line, said adsorption cycle comprising successively:
    1. in a constant-pressure extraction stage, introducing said gaseous mixture successively into the inlet of said adsorption line in which it circulates in said first adsorber in the adsorption direction under a first pressure and then is expanded between said first adsorber and said second adsorber down to a second lower pressure and then circulates in said second adsorber still in the adsorption direction under said second pressure, and withdrawing a gaseous fraction impoverished in at least said one constituent from the outlet of said adsorption line, under a constant pressure,
    2. in a stage of pressure reduction during which the outlet of said adsorption line is closed and the inlet of said second adsorber is in fluid communication with the outlet of said first adsorber, withdrawing from the inlet of said adsorption line, countercurrently to the adsorption direction, at least one gaseous fraction enriched in at least said one constituent, while reducing the pressure in said first and second adsorbers down to a low pressure lower than said second pressure,
    3. in a pressure-increase stage, increasing the pressure existing in said first adsorber and said second adsorber from said low pressure up to the first pressure and up to the second pressure respectively.

2. A method according to claim 1, wherein there is a balancing stage between said constant-pressure extraction stage and said pressure-reduction stage during which at least the inlet of said adsorption line is closed and the outlet of said first adsorber is in free fluid communication with the inlet of said second adsorber, whereby the pressures existing in said first adsorber and said second adsorber are respectively reduced and increased to a pressure intermediate said first pressure and said second pressure.

3. A method according to claim 1, wherein the pressure-increase stage comprises:
    3.1 in a front-rise period, introducing into the outlet of at least said second adsorber, countercurrently to the adsorption direction, a gaseous fraction impoverished in at least said one constituent, while increasing at least the pressure existing in said adsorber, up to a final pressure at most equal to the second pressure,
    3.2 in an inflation period, introducing the gaseous mixture into the inlet of at least said first adsorber, in the adsorption direction, while increasing at least the pressure existing in said adsorber, up to the first pressure.

4. A method according to claim 3, wherein the front-rise period and the inflation period are carried out simultaneously.

5. A method according to claim 3, wherein the front-rise period and the inflation period are carried out one after the other.

6. A method according to claim 3, wherein during the front-rise period, the said impoverished gaseous fraction is also introduced into the outlet of said first adsorber, countercurrently to the adsorption direction, while increasing also the pressure existing in said first adsorber to a final pressure at most equal to the second pressure.

7. A method according to claim 6, wherein during the front-rise period, the inlet of said first adsorber is in free fluid communication with the outlet of said second adsorber, and said impoverished gaseous fraction is introduced into the outlet of the adsorption line, countercurrently to the adsorption direction, the inlet of said adsorption line being closed, while simultaneously increasing the pressure existing in said first and second adsorbers up to said final pressure.

8. A method according to claim 6, wherein during the front-rise period, said impoverished gaseous fraction is introduced into the outlet of said first and second adsorbers, independently from each other, the inlets of said first and second adsorbers being closed, while increasing the pressure existing in said first and second adsorbers up to said final pressure.

9. A method according to claim 8, wherein during the front-rise period, said impoverished gaseous fraction is introduced into the outlet of said second adsorber, while increasing the pressure existing in this latter up to the final pressure, and then into the outlet of said first adsorber while increasing the pressure existing in this latter up to the final pressure.

10. A method according to claim 3, wherein during the front-rise period, the pressure existing in at least said second adsorber is increased up to a final pressure substantially equal to the second pressure.

11. A method according to claim 3, wherein during the front-rise period, the pressure existing in said first and second adsorbers is increased up to a final pressure substantially equal to the second pressure.

12. A method according to claim 3, wherein the front-rise period comprises:
3.1.1 in an initial front-rise phase, introducing a part of said impoverished gaseous fraction into the outlet of at least said second adsorber, countercurrently to the adsorption direction, while increasing the pressure existing in at least said second adsorber up to the second pressure,
3.1.2. an intermediate balancing phase during which said adsorption line is isolated, and the inlet of said second adsorber, initially under the second pressure, is in free fluid communication with the outlet of said first adsorber, initially at the low pressure, and at the end of said balancing phase the pressure existing in said first and second adsorbers is equal to a pressure intermediate said low and second pressures,
3.1.3. in a final front-rise phase, introducing another part of said impoverished gaseous fraction into the outlet of at least said second adsorber, counter-currently to the adsorption direction, while increasing the pressure existing in at least said second adsorber up to the second pressure.

13. a method according to claim 3, wherein during the front-rise period, the pressure existing in at least said second adsorber is increased up to a final pressure lower than the second pressure, and during the inflation period the gaseous mixture is also introduced into the inlet of at least said second adsorber, in the adsorption direction, while increasing the pressure existing in at least said second adsorber from said final pressure up to the second pressure.

14. A method according to claim 13, wherein during the inflation period, the gaseous mixture is introduced into the inlet of the adsorption line, in the adsorption direction, the outlet of said line being closed, and the outlet of said first adsorber is in fluid communication with the inlet of said second adsorber, while simultaneously increasing the pressure existing in said first and second adsorbers up to the first and second pressures respectively.

15. A method according to claim 3, wherein during the front-rise period the pressure existing in at least said second adsorber is increased up to a final pressure lower than the second pressure, and the inflation period comprises:
3.2.1. in a primary inflation phase introducing the gaseous mixture through the inlet of the adsorption line, in the adsorption direction, the outlet of said line being closed, and the outlet of said first adsorber is in fluid communication with the inlet of said second adsorber, while simultaneously increasing the pressure existing in said first and second adsorbers up to the second pressure;
3.2.2. in a secondary inflation phase, introducing the gaseous mixture exclusively into the inlet of said first adsorber, in the adsorption direction, while increasing the pressure existing in said adsorber up to the first pressure.

16. A method of fractionation of a gaseous mixture by adsorption, utilizing at least two adsorption lines, each line including at least one adsorber comprising at least one adsorbent mass which preferentially adsorbs at least one constituent of the gaseous mixture, said method comprising at least one adsorption cycle carried out with at least one adsorption line, said adsorption cycle comprising successively:
1. in a constant-pressure extraction stage, introducing said gaseous mixture into the inlet of said adsorption line, under a high pressure, in an adsorption direction, and withdrawing a gaseous fraction impoverished in at least said one constituent from the outlet of said adsorption line, in said adsorption direction, under a constant pressure,
2. in a regeneration stage comprising:
2.1. in a balancing period, withdrawing at least a gaseous fraction from the outlet of said adsorber, in said adsorption direction, while reducing at least the pressure existing in said adsorber from a pressure at most equal to the high pressure down to an intermediate pressure,
2.2. in a period of pressure reduction during which the outlet of said adsorption line is closed, withdrawing from the inlet of said adsorption line, countercurrently to the adsorption direction, at least one gaseous fraction enriched in at least said one constituent, while reducing at least the pressure existing in said adsorber, from said intermediate pressure down to a low pressure,
3. in a pressure-increase stage including successively:
3.1. in another balancing period carried out during at least part of the balancing period of the regeneration stage of the other adsorption line, introducing into at least the inlet of said adsorber, in the adsorption direction, a gaseous fraction withdrawn also in said adsorption direction from at least the outlet of a corresponding other adsorber in said adsorption direction of the other adsorption line, while increasing at least the pressure in said adsorber up to another intermediate pressure, 3.2. in a front-rise period, introducing a gaseous fraction impoverished in at least said one constituent into at least the outlet of said adsorber, countercurrently to the adsorption direction, while increasing at least the pressure existing in said adsorber from said another intermediate pressure up to a final pressure lower than said high pressure, 3.3. in an inflation period, introducing said gaseous mixture into at least the inlet of said adsorber, in the adsorption direction, while increasing at least the pressure existing in said adsorber from said final pressure, up to a pressure at most equal to said high pressure, each adsorption line comprising, in the direction of adsorption, at least one first adsorber and one second adsorber, said another balancing period of the pressure-increase stage comprising:

in a first balancing period, placing the inlet of the first adsorber into communication with the outlet of the corresponding other first adsorber of the other adsorption line, in a second balancing period, placing the inlet of the second adsorber into communication with the outlet of the corresponding other second adsorber of the other adsorption line.

* * * * *